(12) United States Patent
Wagner et al.

(10) Patent No.: US 12,519,172 B2
(45) Date of Patent: Jan. 6, 2026

(54) SLOTTED DEVICE FEATURE

(71) Applicant: Raytheon Canada Limited, Ottawa (CA)

(72) Inventors: Kevin B. Wagner, Wyevale (CA); John M. Connolly, Penetanguishene (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 371 days.

(21) Appl. No.: 17/794,094

(22) PCT Filed: Jan. 21, 2020

(86) PCT No.: PCT/CA2020/050067
§ 371 (c)(1),
(2) Date: Jul. 20, 2022

(87) PCT Pub. No.: WO2021/146792
PCT Pub. Date: Jul. 29, 2021

(65) Prior Publication Data
US 2023/0049401 A1    Feb. 16, 2023

(51) Int. Cl.
*H01M 50/271* (2021.01)
(52) U.S. Cl.
CPC . *H01M 50/271* (2021.01); *B65D 2543/00898* (2013.01)
(58) Field of Classification Search
CPC ............... H01M 50/271; H01M 50/153; F16B 23/0015; F16B 23/0092; B65D 2543/00898

USPC .......................................... 220/284; 215/302
See application file for complete search history.

(56) References Cited

U.S. PATENT DOCUMENTS

| 667,145 | A | * | 1/1901 | Fuller | ....................... B67B 7/18 |
| | | | | | 220/284 |
| 3,540,342 | A | | 11/1970 | Vaughn | |
| 5,269,209 | A | | 12/1993 | Baker | |
| 6,951,158 | B1 | * | 10/2005 | Edland | .................. B25B 15/005 |
| | | | | | 411/404 |
| 2004/0055259 | A1 | * | 3/2004 | Caruso | ................... B44D 3/127 |
| | | | | | 53/471 |
| 2005/0067416 | A1 | * | 3/2005 | Kusz | ..................... B65D 50/04 |
| | | | | | 220/288 |

FOREIGN PATENT DOCUMENTS

CN    202732600 U    2/2013

OTHER PUBLICATIONS

International Search Report and Written Opinion dated Sep. 9, 2020 for Application No. PCT/CA2020/050067; 8 Pages.

* cited by examiner

*Primary Examiner* — James N Smalley
(74) *Attorney, Agent, or Firm* — NORTON ROSE FULBRIGHT CANADA LLP

(57) ABSTRACT

In some embodiments, a method includes: selecting dimensions of a slot to be provided in a device feature, the dimensions selected to accommodate one or more tools while resulting in tangential contact between the slot and the one or more tools when the one or more tools are inserted into the slot and used to manipulate the device feature; and forming the slot in a surface of the device feature according to the selected dimensions.

19 Claims, 9 Drawing Sheets

SLOTTED DEVICE FEATURE

CROSS REFERENCE TO RELATED APPLICATIONS

This application is a U.S. national stage filing under 35 U.S.C § 371 of PCT application number PCT/CA2020/050067 filed on Jan. 21, 2020 and entitled "IMPROVED SLOTTED DEVICE FEATURE" which application is hereby incorporated herein by reference in its entirety.

BACKGROUND

As is known in the art, many devices and products have slotted features to allow for adjustment or closure of the device. For example, many battery-powered devices, including commercial and military devices, include battery compartments enclosed with removable caps. A slot may be provided in the cap, allowing a user to insert a tool and rotate the cap to access the device's battery. As another example, many commercial and military products include slotted features, such as dials, that can adjusted to change operation of the device. As yet another example, some furniture and cabinetry can be assembled or tightened using slotted hardware elements. In such devices and products, the slotted features may be designed to accept various types of tools. For convenience, many devices and products have slotted features that accept common household objects, such as flat-head screwdrivers and various types of coins. Even if a specialized tool is provided to fit "perfectly" into the slotted feature, users may find it more convenient to use coins or other commonly available objects. With existing devices and products, repeated use of such tools to manipulate the slotted feature can cause aesthetic and functional damage.

SUMMARY

According to one aspect of the present disclosure, a method can include: selecting dimensions of a slot to be provided in a device feature, the dimensions selected to accommodate one or more tools while resulting in tangential contact between the slot and the one or more tools when the one or more tools are inserted into the slot and used to manipulate the device feature; and forming the slot in a surface of the device feature according to the selected dimensions.

In some embodiments, the slot can have a long side defined by a first convex surface and a second convex surface opposite the first convex surface. In some embodiments, selecting the dimensions of the slot can include selecting a radius of the first convex surface to result in the tangential contact between the slot and the one or more tools. In some embodiments, the selected radius is the radius of both the first and second convex surfaces. In some embodiments, the dimensions of the slot may be selected to result in tangential contact between the slot and the one or more tools when the one or more tools are rotated to manipulate the device feature. In some embodiments, the one or more tools include a plurality of types of coins. In some embodiments, selecting the dimensions of the slot can include selecting a minimum width of the slot to be at least as wide as the thickest coin from the plurality of coins.

In some embodiments, the one or more tools can include a first tool having a flat surface and the dimensions can be selected to distribute contact forces between the first tool and the slot over the flat surface when the first tool is inserted into the slot and used to manipulate the device feature. In some embodiments, the device feature can include an enclosure or adjustment feature of a device. In some embodiments, the method can include forming a recess in the slot to provide centering of the one or more tools within the slot.

According to another aspect of the present disclosure, a slotted feature for use in a device can include: a slot formed in a surface of the device feature, the slot having dimensions selected to accommodate one or more tools while resulting in tangential contact between the slot and the one or more tools when the one or more tools are inserted into the slot and used to manipulate the slotted feature.

In some embodiments, the slot can have a long side defined by a first convex surface and a second convex surface opposite the first convex surface. In some embodiments, the selected dimensions of the slot can include a radius of the first convex surface selected to result in the tangential contact between the slot and the one or more tools. In some embodiments, the selected radius is the radius of both the first and second convex surfaces. In some embodiments, the dimensions of the slot can be selected to result in tangential contact between the slot and the one or more tools when the one or more tools are rotated to manipulate the slotted feature. In some embodiments, the one or more tools include a plurality of types of coins. In some embodiments, the selected dimensions can include a minimum width of the slot selected to be at least as wide as the thickest coin from the plurality of coins.

In some embodiments, the one or more tools can include a first tool having a flat surface and the dimensions can be selected to distribute contact forces between the first tool and the slot over the flat surface when the first tool is inserted into the slot and used to manipulate the device feature. In some embodiments, the device feature can include an enclosure or adjustment feature of a device. In some embodiments, the device feature can include a recess formed along a button surface of the slot to provide centering of the one or more tools within the slot.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

As used herein, the terms "slotted device feature" and "slotted feature" refer to a portion of a device or product that includes a slot capable of accepting one or more types of tools for manipulating the feature (e.g., for rotating the feature). Non-limiting examples of slotted device features include enclosure features, such as battery caps, and adjustment features, such as dials. Slotted device features can be removably or fixedly attached to the device. While embodiments of the present disclosure are illustrated in the context of a closure feature (e.g., a battery cap) that can be opened or closed by rotating a tool within a slot, the structures and techniques sought to be protected herein are not limited to any particular type of slotted device feature.

Figure 1:
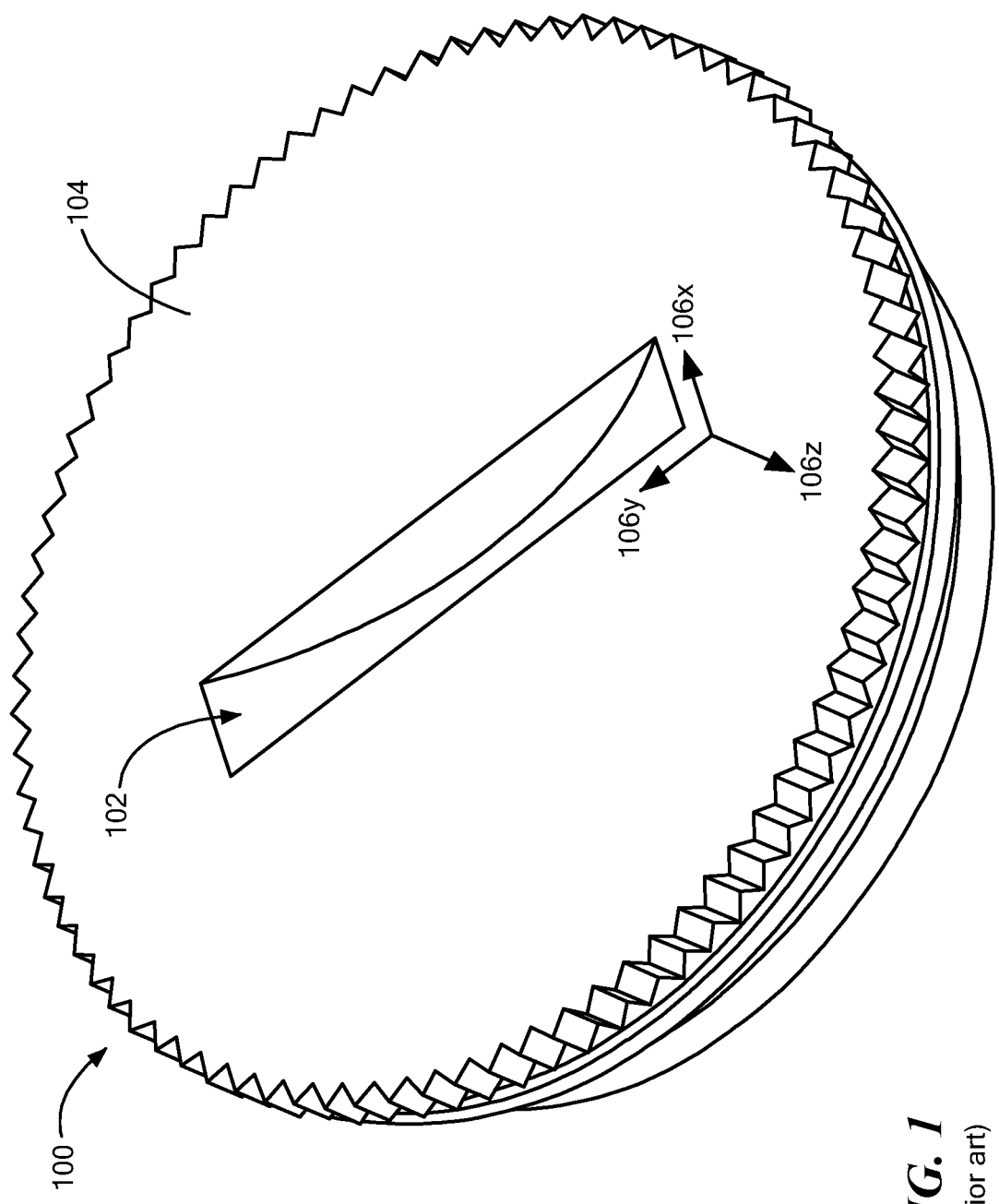
FIG. 1 is a perspective view of a prior art slotted device feature.
Figure 1A:
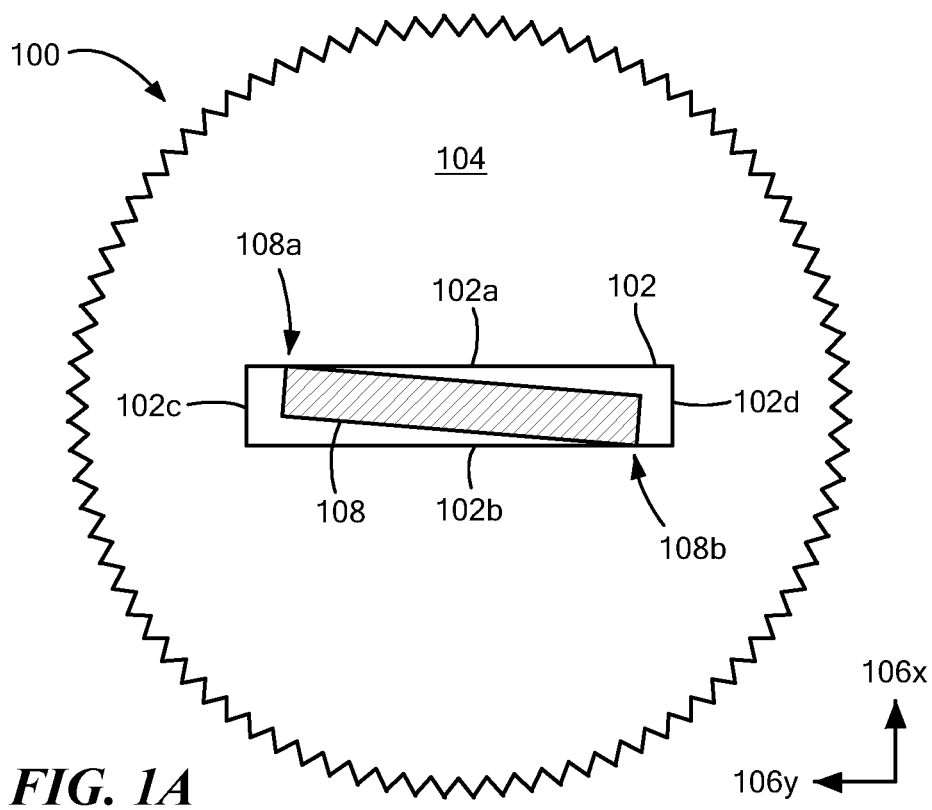
FIGS. 1A and 1B are top views of prior art slotted device features.
Figure 1B:
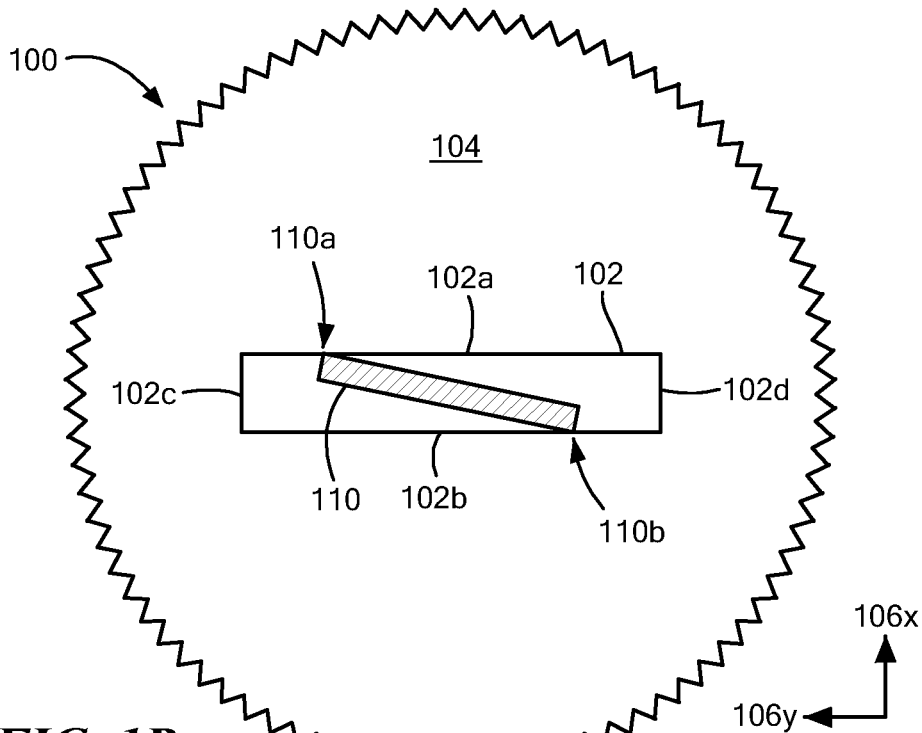

FIGS. 1, 1A, and 1B show a slotted feature 100 such as can be found in prior art devices and products. For example, feature 100 may correspond to a removable battery cap found in existing consumer products or military equipment. The feature 100 includes a slot 102 formed in a surface 104 of the feature. Slot 102 can be a three-dimensional space defined by a two-dimensional opening in surface 104 (e.g., an opening on the plane defined by x-y axes 106x, 106y) and depth from the surface 104 (e.g., distance along a z-axis 106z).

As best seen in FIGS. 1A and 1B, the slot 102 found in prior art device feature 100 can have a substantially rectangular shape when viewed from above. More generally, in the plane defined by x-y axes 106x, 106y, a slot 102 found in prior art device feature can have a long side defined by edges 102a, 102b and a (relatively) short side defined by edges 102c, 102d, wherein the long side edges 102a, 102b are parallel or approximately parallel.

As shown in FIGS. 1A and 1B, the slot 102 may be sized to receive various tools including coins or other common household objects. Such tools may be made of materials that are relatively hard compared to the material from which the slotted device feature 100 is made. For example, a tool may be made of a metal and slotted device feature 100 may be made of plastic (e.g., may have a plastic substrate). Many tools have points that, when exerted with a less durable material with sufficient force, can cause damage to the less durable material. For example, many types of coins have points where face surfaces and side surfaces meet at 90-degree angles. Such points are referred to herein as "corners."

Referring to FIG. 1A, when a tool (e.g., a coin) 108 is inserted into the slot 102 and rotated, the contact forces between the tool 108 and the slot 102 may be concentrated at the points where corners of the tool 108 come into contact with the slot 102. Thus, as shown in FIG. 1A, the contact forces may be concentrated at points 108a and 108b along parallel edges 102a and 102b, respectively, where the corners of the tool contact the slot. After repeated use, the feature 100 may become damaged due to due to such forces exerted by the corners of the tool 108 at points 108a, 108b and at other points along the long side of the slot 102.

FIG. 1B shows that the same problem can occur using a different size tool (e.g., a different type of coin) 110 when the contact forces exerted by tool 110 are concentrated at points 110a, 110b along the long side of slot 102. It is appreciated herein that, even if a tool has substantially identical dimensions as the two-dimensional slot opening, contact forces exerted by the tool can still be concentrated where the corners of the tool come into contact with the substantially parallel edges 102a, 102b of the slot, leading to functional or aesthetic damage over time. In some prior art devices and products, a slotted device feature 100 may be provided within a high wear or hardness coatings, however such features are only as durable as feature's substrate (e.g., plastic) and thus will also tend to damage over time.

Referring to FIGS. 2 and 2A-2E, in which like elements are shown like using reference numbers, a slotted device feature 200 is designed to reduce (and ideally eliminate) damage caused by various types of tools, according to embodiments of the present disclosure. The illustrative feature 200 includes a slot 202 shaped such that there is tangential contact between the slot 202 and a tool when the tool is inserted into the slot and used to manipulate the feature 200 (e.g., used to rotate the device feature). As used here, the term "tangential contact" refers to contact between a flat surface (e.g., a flat surface of a tool) and a curved surface (e.g., a curved portion of a slot with which the tool is engaged. Various types of tools have flat surfaces that can make tangential contact with the improved slot designs disclosed herein. For example, many types of coins have two opposing flat surfaces (i.e., "faces"). As another example, flat-head screwdrivers have flat tips. It is appreciated herein that tangential contact can reduce/eliminate damage over time in that the contact forces primarily occur where the flat surface of the tool contacts the curved surface of the slot compared to prior art designs wherein contact forces tend to be concentrated at points where the corners of a tool contact the slot (i.e., line contact with a curved surface instead of sharp point contact between surfaces).

Figure 2:
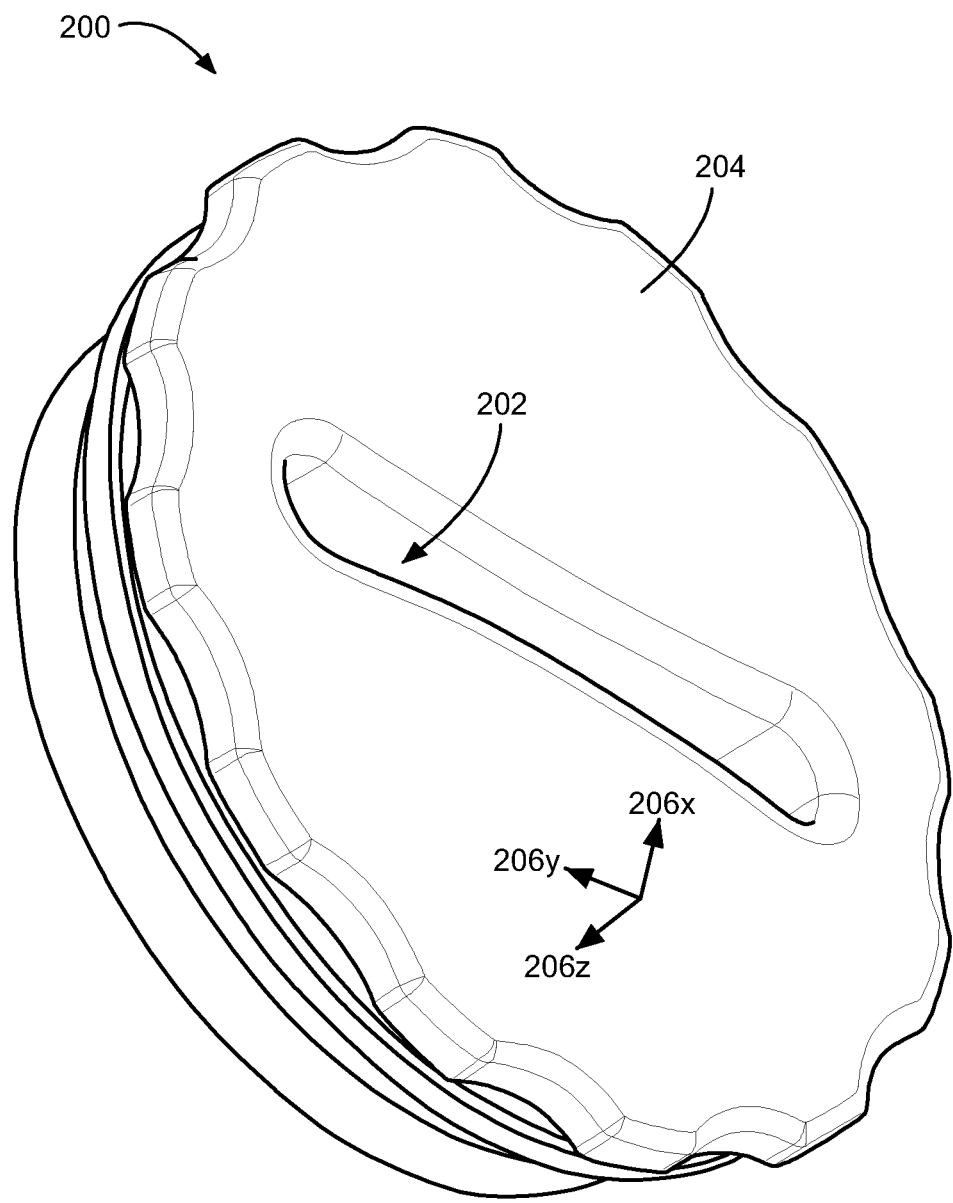
FIG. 2 is a perspective view of an improved slotted device feature, according to an embodiment of the present disclosure.

Referring to FIG. 2, illustrative device feature 200 includes a slot 202 formed in a surface 204 of the feature. Slot 202 can be a three-dimensional space corresponding by a two-dimensional opening in surface 204 (e.g., an opening on the plane defined by x-y axes 206x, 206y) and depth from the surface 204 (e.g., distance along a z-axis 206z).

Figure 2A:
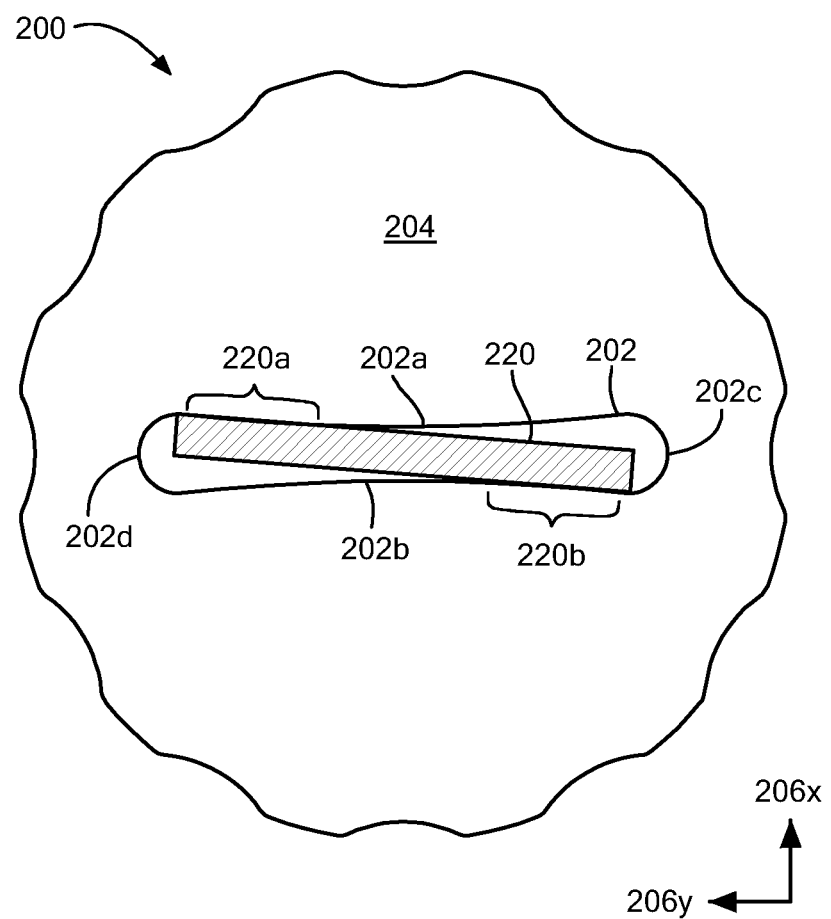
FIGS. 2A-2E are top views of an improved slotted device feature, according to some embodiments of the present disclosure.

As can be seen in FIG. 2A, the improved slot design 202 can have a long side defined by curved edges 202a, 202b and a (relatively) short side defined by rounded edges 202c, 202d. In other embodiments, short-side edges 202c, 202d may be straight. When a tool 220 (e.g., a particular type of coin) is inserted into the slot 202 and rotated, the tool 220 makes tangential contact with the slot 202, as shown. In particular, a first flat surface of the tool 220 contacts a curved portion 220a of first long edge 202a, and a second flat surface of the tool 220 contacts a curved portion 220b of second long edge 202b. As such, when the tool 220 is rotated within the slot 202, the contact forces exerted by the tool 220 on the slot 202 are distributed over the edge portions 220a and 220b.

In FIG. 2A, tool 220 is shown making contact at along slot edge portions 220a, 220b, which may correspond to the tool 220 being turned in clockwise direction (looking down at feature surface 204). It is to be understood that the illustrative slot design 202 provides tangential contact with a tool inserted therein regardless of which direction the tool is rotated.

Figure 2B:
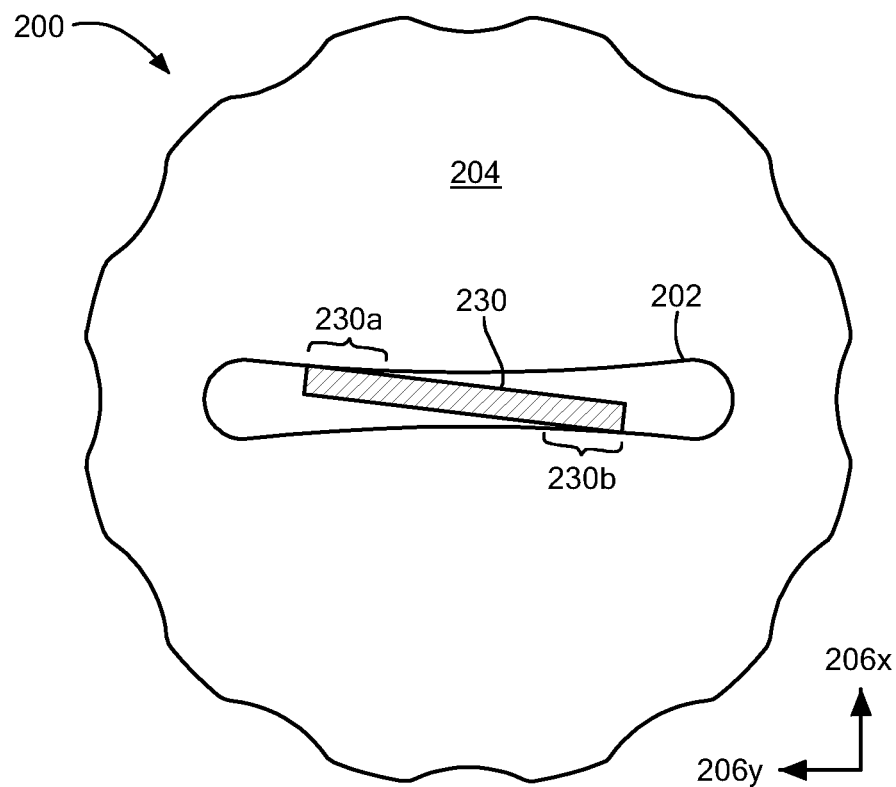
Figure 2C:
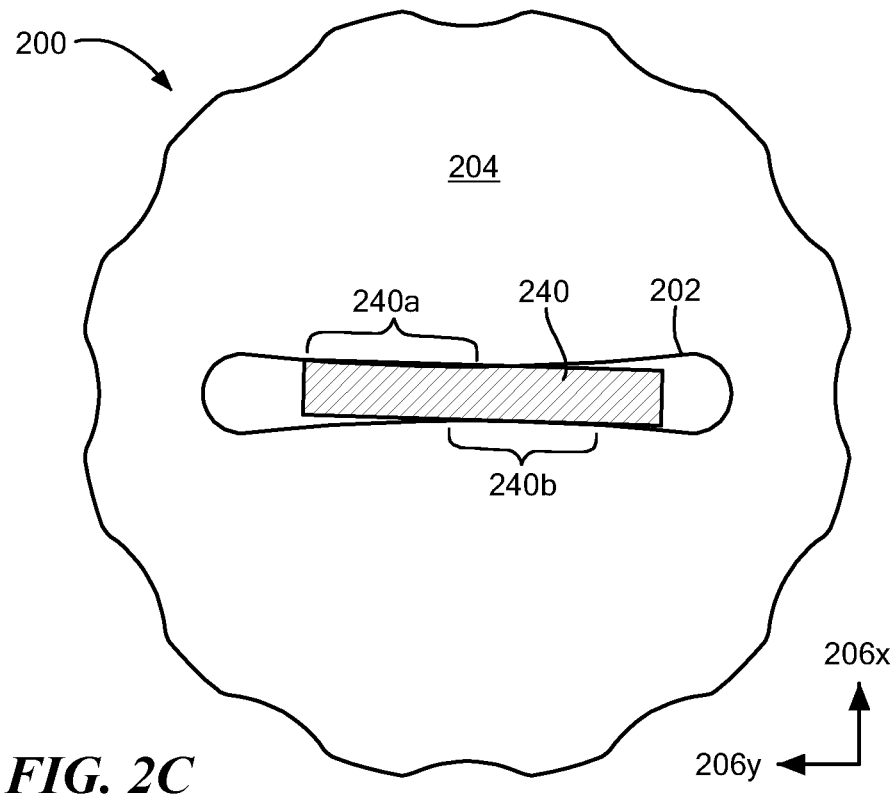

FIGS. 2B and 2C show how the improved slot design results in tangential contact for various sized tools (e.g., different types of coins). In FIG. 2B, a second tool 230 having a different shape (compared to tool 220 in FIG. 2A) also makes tangential contact with the slot 202, here at edge portions 230a and 230b. In FIG. 2C, a third tool 240 having yet another shape and size also makes tangential contact with the slot 202, here at edge portions 240a and 240b. In some embodiments, the three different tools 220, 230, 240 illustrated in FIGS. 2A-2C may represent three different types of coins.

It is appreciated that the improved slot design 202 illustrated in FIGS. 2A-2C can accommodate a variety of tool widths and lengths. As the width and/or length of the tool changes, the position of the tangential contact moves along the curved surfaces of the slot to avoid damaging point contact between the tool and the device feature.

Figure 2D:
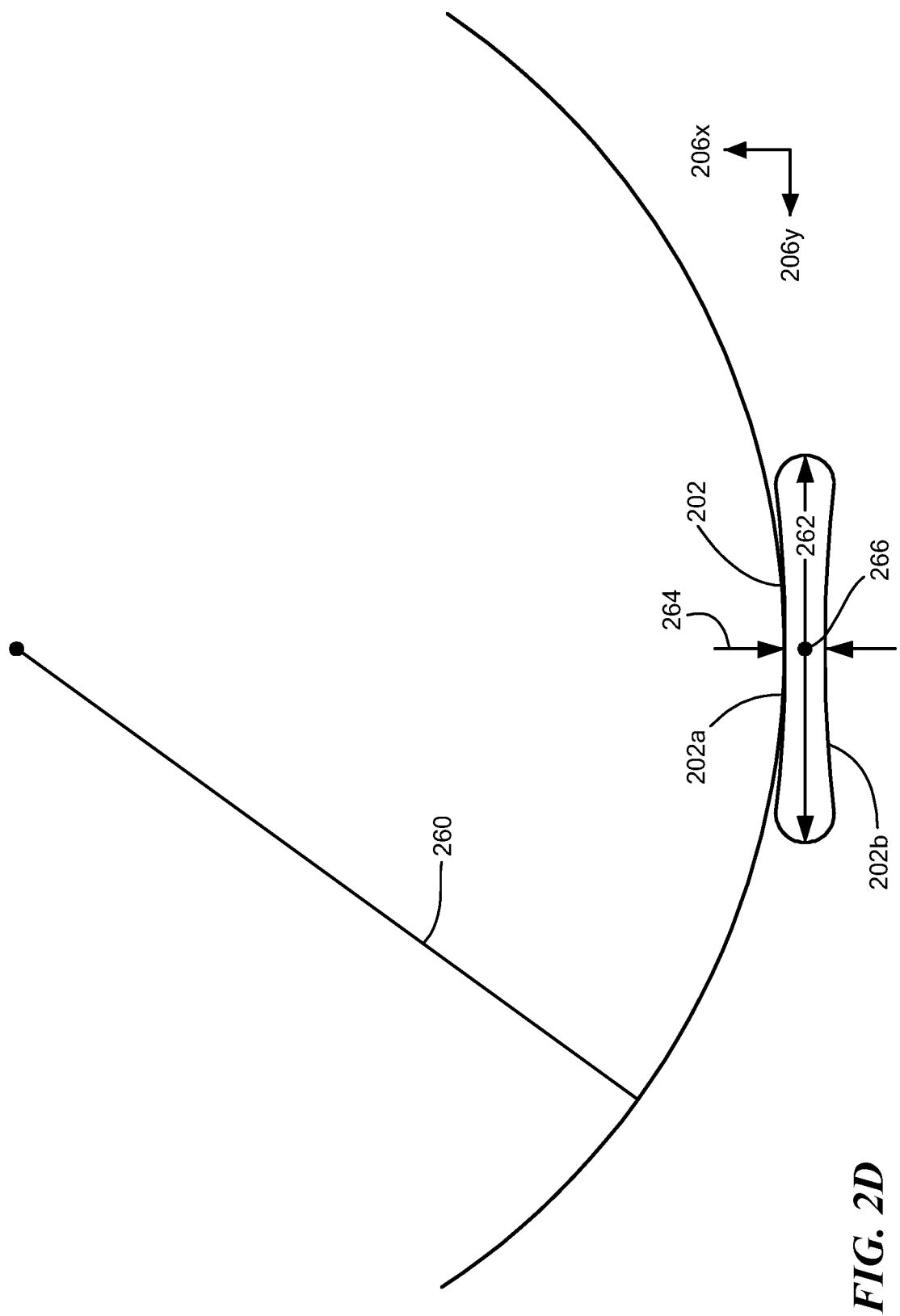

Turning to FIG. 2D, to achieve tangential contact between the slot 202 and a variety of different sized and/or shaped tools, the slot 202 may be designed such that at least portions of long side edges 202*a*, 202*b* are curved to form opposing convex surfaces, as shown. The curvature of surfaces 202*a*, 202*b* may be defined by a radius 260. For clarity, FIG. 2D only illustrates how first curved edge 202*a* is defined by a radius 260, however it should be understood that second curved edge 202*b* can likewise be defined by the same radius 260 or by a different radius. The geometry of slot 202 can further be defined by a length 262 and a minimum width 264 corresponding to the minimum distance between the opposing convex surfaces 202*a*, 202*b*. The dimensions of the slot 202 may be selected based on the types of tools that are intended, or expected, to be used for manipulating the slotted device feature 200. For example, as illustrated in FIGS. 2A-2C, the slot length 262 and minimum width 264 may be selected to accommodate a variety of coins, where length 262 is selected to be at least as large as the largest diameter of all the coins, and minimum width 264 is selected to be at least as wide as the thickest coin. Radius 260 may be selected so as to achieve tangential contact between the intended/expected tools and the long edges 202*a*, 202*b*.

It should be understood that the depth of the slot 202 determines how deeply the tool 220 can engage. Thus, depending on the shape of the tool being used, only a portion of the tool's contact surface may engage with the slot. For example, in the case of a coin, the portion of the coin that engages with the slot may be less than the coin's diameter, depending on the slot depth. In such cases, for a given slot depth, the other slot dimensions may be selected by considering only the dimensions of tool contact surface that engages with the slot rather than the overall dimensions of the tool contact surface.

Various factors can be considered when selecting the dimensions and geometry of the slot feature 202. For example, the dimensions and geometry of the slot feature 202 may be selected to result in damage-reducing tangential contact for a wide range tools (e.g., tools of various widths and/or lengths). Here, the minimum slot width 264 may be selected to accommodate a range of tool widths, and the radii (e.g., radius 260) may be selected to accommodate a range of tool lengths. It is appreciated that the minimum slot width 264 (i.e., the gap between the contact radii) affects not only the range of tool widths that can be used, but also the position of the tangential contact (e.g., the position of contact regions 220*a*, 220*b* in FIG. 2A). As another example, the dimensions and geometry of the slot feature 202 may be selected to result in tangential contact far enough from the axis of rotation 266 so as to not require excessive torque when manipulating the device feature 200. The axis of rotation 266, which is perpendicular to the sheet of FIG. 2D, may correspond to a midpoint along the length 262 of the slot and a midpoint across the width 264 of the slot.

In some embodiments, the minimum slot width 264 may be selected such that, for a given tool, the tool width is between 65% to 75% of the minimum slot width 264 (e.g., a minimum slot width of about 2.0 mm can be selected for a minimum tool width of about 1.25 mm). In some embodiments, the slot length 262 may be selected such that, for a given tool, the tool length is about 75% of the slot length 262.

In some embodiments, the slot length 262 and minimum slot width 264 may be selected in proportion to each other. For example, the slot length 262 may be selected to be about 10 times the minimum slot width 264.

In some embodiments, the slot length 262 and radius 260 may be selected in proportion to each other. For example, the slot radius/radii 260 may be selected to be about 5 times the slot length 262.

Figure 2E:
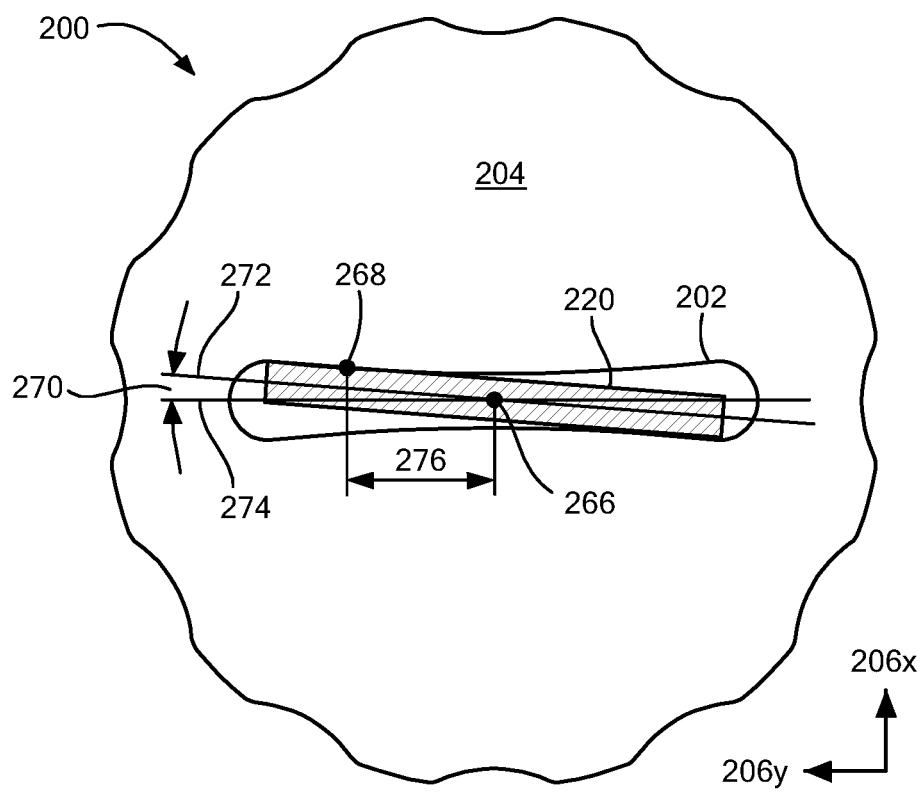

Turning to FIG. 2E, in some embodiments, the dimensions of the slot feature 202 may be selected to result in a particular angle 270 between a line 272 traversing the length of the tool 220 and a line 274 traversing the length of the slot 202. In some embodiments, the angle 270 may be about 5.6°.

In some embodiments, the dimensions of the slot 202 may be selected such that a distance from the axis of rotation 266 to a tangential contact position 268 are in a certain proportion to the minimum slot width 264. For example, measured along line 274, the distance 276 from the axis of rotation 266 to the tangential contact position 268 may be about 2.5 times the minimum slot width. As previously discussed, the distance between the axis of rotation and the tangential contact position can affect the amount of torque required manipulating the device feature 204.

In some embodiments, the slot depth may be selected to be substantially less than the slot length. In some embodiments, the slot depth may be selected based on the dimensions of a given tool. For example, for a given tool, the slot depth may be selected to achieve a minimum distance between the axis of rotation 266 and the tangential contact position 268.

Figure 3A:
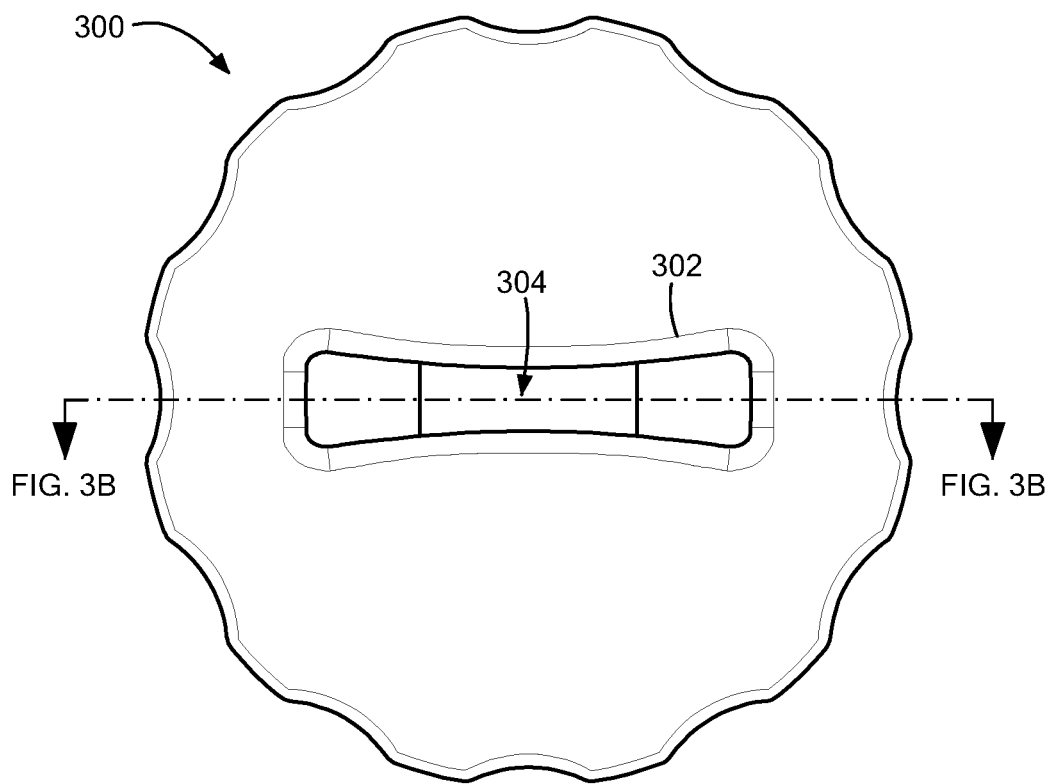
FIG. 3A is a top view of an improved slotted device feature having a tool centering recess, according to some embodiments of the present disclosure.
Figure 3B:
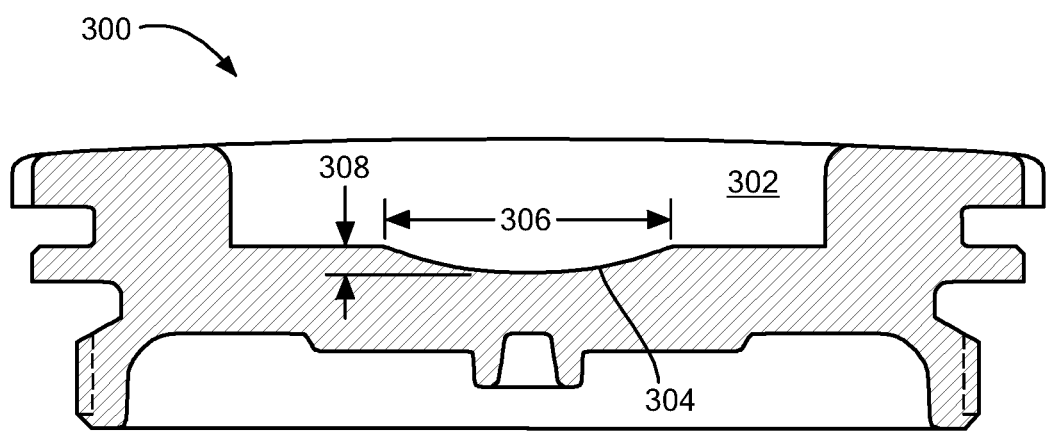
FIG. 3B is a side cross-sectional view of the improved slotted device feature shown in FIG. 3A, according to some embodiments of the present disclosure.

Referring to FIGS. 3A and 3B, according to some embodiments, a device feature 300 can a tool centering recess 304 formed along the bottom of a slot 302. The dimensions and geometry of the recess 304 may be selected based on the dimensions of one or more tools used to engage with the slotted device feature 300. For example, the length 306 and depth 308 of the recess 304 may be selected based on the diameters of one or more types of coins. The recess 304 may be centered along the length of the slot 302. In this arrangement, when a tool is engaged with the slot 302 to manipulate the device feature 300 (e.g., to rotate the device feature 300), the recess 304 causes the tool to stay centered within the slot and prevents the tool from sliding along the length of the slot. Thus, the embodiment illustrated in FIGS. 3A and 3B can make it easier for a user to manipulate the device feature 300 using coins or other commonly available tools.

Figure 4:
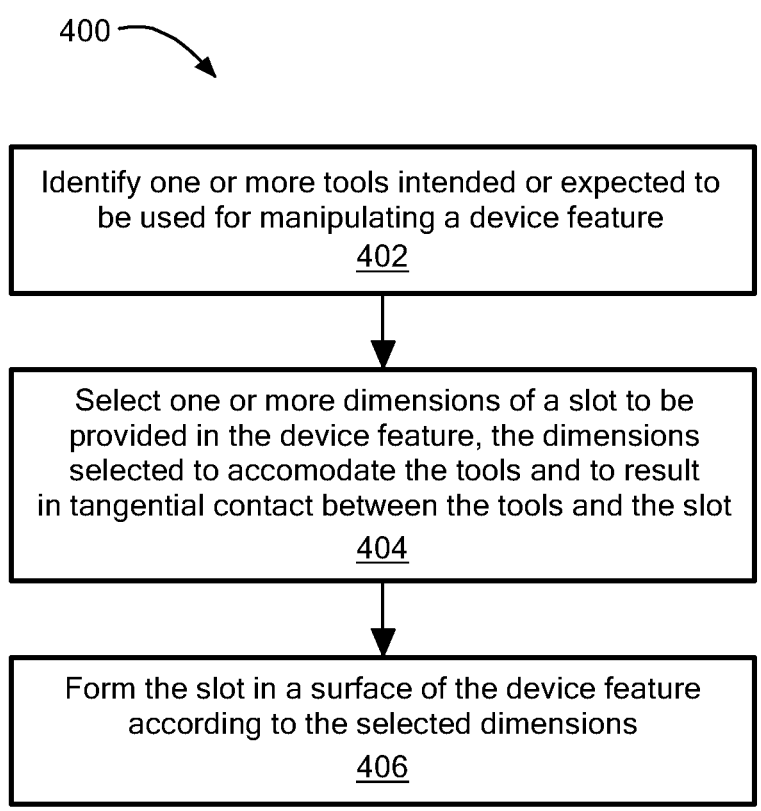
FIG. 4 is a flow diagram showing a method for making an improved slotted device feature, according to some embodiments of the present disclosure.

Referring to FIG. 4, a method 400 can be used to make improved slotted device features, according to some embodiments of the present disclosure. The illustrative method 400 can be used in the manufacture of various products and devices that include slotted features, such as products/devices that have enclosure or adjustment features. In some embodiments, method 400 can be implemented within, or otherwise utilized by, computer-aided design (CAD) and/or computer-aided manufacturing (CAM) software.

At block 402, one or more tools that are intended or expected to be used for manipulating the slotted device feature are identified. For example, the identified tools can include a specially designed tool intended for use with the device feature and/or household objects that are likely to be used as a matter of convenience. In some cases, the tools can include one or more different types of coins. In some embodiments, the tools may have one or more flat surfaces capable of making tangential contact with a point or set of points.

At block 404, one or more dimensions can be selected for a slot to be provided in the device feature. The dimensions may be selected to accommodate the one or more tools while, at the same time, resulting in tangential contact between the slot and the one or more tools when the one or more tools are used to manipulate the device feature. In some embodiments, the slot is designed to have a long side defined by two edges, whereby at least portions of the long side edges are curved to form opposing convex surfaces. In particular embodiments, the opposing convex surfaces may each by defined by a radius. The selected dimensions can include, for example, a depth of the slot, a length of the slot, a minimum width of the slot, and the radii of the convex surfaces. In some embodiments, the convex surfaces may have the same radius. The radius/radii can be selected to result in tangential contact between the slot and a tool when the tool is inserted into the slot and rotated to manipulate the device feature. In the case where the intended/expected tools include different types of coins, the slot dimensions can be selected based on the dimensions of the largest and smallest coins based on diameter, thickness, or both. In some embodiments, the dimensions of the slot feature can be selected using one or more techniques described above in the context of FIGS. 2A-2E.

At block 406, the slot is formed in a surface of the device feature according to the dimensions selected at block 404. Standard manufacturing processes such as casting, molding, machining, and printing may be used to produce the slot feature. In some embodiments, a recess may be formed along the bottom of the slot to help center tools engaged with the device feature, as discussed above in the context of FIGS. 3A and 3B.

The disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
  selecting dimensions of a slot to be provided in a device feature, the dimensions selected to accommodate various tools while resulting in tangential contact between the slot and each of the various tools when each of the various tools are inserted into the slot and used to manipulate the device feature; and
  forming the slot in a surface of the device feature according to the selected dimensions, the slot having a long side defined by a first convex surface and a second convex surface opposite the first convex surface, the slot having a length and a minimum width corresponding to a minimum distance between the first and second convex surfaces, the minimum width located at a midpoint along the length of the slot, the slot located entirely within a periphery of the device feature;
  wherein selecting dimensions of the slot includes selecting the length of the slot to be about 10 times the minimum width of the slot; and
  wherein the dimensions of the slot are selected such that, as measured along a longitudinal axis of the slot, a distance from the midpoint of the length of the slot to a tangential contact position of each of the various tools with one of the first and second convex surfaces of the slot is about 2.5 times the minimum width of the slot.

2. The method of claim 1, wherein selecting the dimensions of the slot includes selecting a radius of the first convex surface to result in the tangential contact between the slot and each of the various tools, wherein the radius is about 5 times the length of the slot.

3. The method of claim 2, wherein the selected radius is the radius of both the first and second convex surfaces.

4. The method of claim 1, wherein the dimensions of the slot are selected to result in tangential contact between the slot and each of the various tools when each of the various tools are rotated to manipulate the device feature.

5. The method of claim 1, wherein the various tools include a plurality of types of coins.

6. The method of claim 5, wherein selecting the dimensions of the slot includes:
  selecting a minimum width of the slot to be at least as wide as the thickest coin from the plurality of coins.

7. The method of claim 1, wherein the various tools include a first tool having a flat surface, wherein the dimensions are selected to distribute contact forces between the first tool and the slot over the flat surface when the first tool is inserted into the slot and used to manipulate the device feature.

8. The method of claim 1, wherein the device feature comprises an enclosure or adjustment feature of a device.

9. The method of claim 1, comprising forming a recess along a bottom of the slot to provide centering of each of the various tools within the slot, the recess centered along the length of the slot.

10. A slotted feature for use in a device, the slotted feature comprising:
  a slot formed in a surface of the slotted feature, the slot located entirely within a periphery of the slotted feature, the slot having dimensions selected to accommodate a variety of tools while resulting in tangential contact between the slot and each of the variety of tools when each of the variety of tools are inserted into the slot and used to manipulate the slotted feature, wherein the slot has a long side defined by a first convex surface and a second convex surface opposite to the first convex surface, the slot having a length and a minimum width corresponding to a minimum distance between the first and second convex surfaces, the minimum width located at a midpoint along the length of the slot, and wherein the dimensions of the slot are selected such that, as measured along a longitudinal axis of the slot, a distance from the midpoint of the length of the slot to a tangential contact position of each of the variety of tools with one of the first and second convex surfaces of the slot is about 2.5 times the minimum width of the slot, and wherein the length of the slot is about 10 times the minimum width of the slot.

11. The slotted feature of claim 10, wherein the selected dimensions of the slot include a radius of the first convex surface selected to result in the tangential contact between the slot and each of the variety of tools, wherein the radius is about 5 times the length of the slot.

12. The slotted feature of claim 11, wherein the selected radius is the radius of both the first and second convex surfaces.

13. The slotted feature of claim 10, wherein the dimensions of the slot are selected to result in tangential contact between the slot and each of the variety of tools when each of the variety of tools are rotated to manipulate the slotted feature.

14. The slotted feature of claim 10, wherein the variety of tools include a plurality of types of coins, and wherein selected dimensions of the slot of the slotted feature include:
a minimum width of the slot selected to be at least as wide as a thickest coin from the plurality of coins.

15. The slotted feature of claim 10, wherein the variety of tools include a first tool having a flat surface, wherein the dimensions of the slot of the slotted feature are selected to distribute contact forces between the first tool and the slot over the flat surface when the first tool is inserted into the slot and used to manipulate the slotted feature.

16. The slotted feature of claim 10, wherein the slotted feature is an enclosure or an adjustment feature of the device.

17. The slotted feature of claim 10, wherein the slotted feature further comprises a recess formed along a button surface of the slot to provide centering of each of the variety of tools within the slot, the recess centered along the length of the slot.

18. The method of claim 1, wherein selecting dimensions of the slot includes selecting the minimum width of the slot such that each of the various tools has a tool width between 65% and 75% of the minimum width of the slot.

19. The slotted feature of claim 10, wherein the dimensions of the slot are selected such that each of the variety of tools has a tool width between 65% and 75% of the minimum width of the slot.

\* \* \* \* \*